United States Patent [19]

Means et al.

[11] Patent Number: 4,700,382
[45] Date of Patent: Oct. 13, 1987

[54] VOICE-SWITCHED TELEPHONE CIRCUIT WITH CENTER IDLE STATE

[75] Inventors: Donald R. Means; Robert C. True; Noble E. Wickliff, all of Indianapolis, Ind.

[73] Assignee: American Telephone and Telegraph Company, AT&T Information Systems, Inc., Murray Hill, N.J.

[21] Appl. No.: 835,588

[22] Filed: Mar. 3, 1986

[51] Int. Cl.$^4$ .............................................. H04M 1/60
[52] U.S. Cl. ................................... 379/390; 379/388; 379/409
[58] Field of Search .............. 179/81 B, 100 C, 170.2, 179/170.6, 170.8; 379/388, 389, 390, 406, 409

[56] References Cited

U.S. PATENT DOCUMENTS

| | | | |
|---|---|---|---|
| 3,823,275 | 7/1974 | La Marchi et al. | 379/406 |
| 3,889,059 | 6/1975 | Thompson et al. | 379/390 |
| 3,894,187 | 7/1975 | Shibata et al. | 379/389 |
| 3,953,676 | 4/1976 | Brown | 379/390 |
| 3,963,868 | 6/1976 | Randmere et al. | 379/390 |
| 4,051,325 | 9/1977 | Mafune et al. | 379/167 |
| 4,161,624 | 7/1979 | Brosow | 379/389 |
| 4,507,524 | 3/1985 | Yun | 379/389 |
| 4,513,177 | 4/1985 | Nishino et al. | 379/389 |
| 4,542,263 | 9/1985 | Mitani | 379/390 |
| 4,560,840 | 12/1985 | Hansen | 379/389 |

Primary Examiner—Gene Z. Rubinson
Assistant Examiner—R. Vaas
Attorney, Agent, or Firm—Michael A. Morra

[57] ABSTRACT

A voice-switched telephone circuit with center idle state improves bi-directional gain control in loudspeaking telephones and thereby enhances the natural quality of interactive conversation. The voice-switched telephone includes: a transmit channel having a microphone and a three-state amplifier; a receiver channel having a three-state amplifier and a loudspeaker; and a hybrid circuit interconnecting the transmit and receive channels to a two-wire telephone line. The present invention is characterized by independent signal level detecting circuits for the transmit and receive channels. When the magnitude of the signal energy in the transmit channel exceeds a predetermined threshold, the transmit channel amplification is increased and the receive channel amplification is decreased by fixed equal amounts. When the magnitude of the signal energy in the receive channel from the two-wire telephone line exceeds a predetermined threshold, the receive channel amplification is increased and the transmit channel amplification is decreased by fixed equal amounts.

11 Claims, 4 Drawing Figures

4,700,382

VOICE-SWITCHED TELEPHONE CIRCUIT WITH CENTER IDLE STATE

TECHNICAL FIELD

The present invention relates to loudspeaking (hands free) telephone systems in general, and in particular to those having three or more transmission states.

BACKGROUND OF THE INVENTION

Loudspeaking telephones (also known as speakerphones or hands free telephones) are ones that locate a microphone and a loudspeaker outside of a conventional telephone handset in somewhat close proximity to each other, thereby creating the potential for sustained oscillation to occur. This situation, known as singing, is often encountered in public address systems when signals from a loudspeaker are too closely coupled to an associated microphone. Loudspeaking telephones generally include amplifiers in both the transmit and receive paths of a telephone set as well as a hybrid circuit that interfaces the transmit and receive channels (comprising 4 wires) to a 2-wire telephone line. Although the hybrid circuit couples most of the transmitted signal energy to the telephone line, a small portion finds its way back into the receive channel. This small portion is attenuated by what is known as trans-hybrid loss. In a similar manner a small portion of the acoustic energy emanating from the loudspeaker is picked up by the transmitting microphone. This small portion is attenuated by what is known as electro-acoustic loss. Thus a loop is created comprising the transmit channel and receive channel coupled by trans-hybrid loss at one end and electroacoustic loss at the other. Oscillation occurs when the net gain around the loop exceeds unity (0 dB).

Perhaps the earliest technique used to circumvent the oscillation problem was the so-called push-to-talk system. In its normal state the transmit channel is disabled and the receive channel is enabled. When a user wants to talk he depresses a manual switch to enable the transmit channel and simultaneously disable the receive channel. Oscillation could never occur because the transmit and receive channels are never on at the same time.

An improvement in the push-to-talk system came when the manual switch is replaced by circuitry that detected speech energy at the transmitter which was thereafter used to enable the transmit channel and disable the receive channel—a technique known as voice switching. A refinement of the voice-switched system came with the inclusion of circuitry to compare the magnitude of the transmit and receive signals and enable the loudest talker to dominate. Apart from the dubious wisdom of rewarding such behavior is the general problem of clipping syllables during the time that directions of transmission are being changed. Prior art circuits frequently combine a 40 dB amplifier with a series switch in the transmit and receive channels; when transmit switch "S1" is on, receiver switch "S2" is off, and vice versa.

Switching 20 dB (10:1) of gain in T seconds, for example, creates about as much noise as switching 40 dB (100:1) of gain in 10 T seconds since it switches the signal 0.1 times as far. To soften switching noise (electrical transients resulting from capture and/or sudden background level noise changes), attack time control circuitry is added. This often results in speech clipping (missed initial voice signals), especially if thee signals are soft as with "h" an "s" sounds. To prevent the loop from oscillating at switching speeds, long time constants, hysteresis, and an offset bias in favor of the transmit channel are built into the loop. When no signals are present, the circuit slowly returns to the condition whereby the transmit channel is enabled and the receive channel is disabled. Some prior art circuits replace S1 and S2 with variolossers to turn the respective channels on and off slowly and in a balanced manner. Other prior art designs control the variolosser in a manner that permits conversation to flow in both directions simultaneously at levels proportional to the volume of the speaking parties. Examples of such techniques are disclosed in U.S. Pat. No. 3,889,059 issued to Thompson et al, U.S. Pat. No. 3,953,676 issued to Brown, and U.S. Pat. No. 4,513,177 issued to Nishino et al. These techniques are generally expensive and are made complex by an algorithm based on a direct comparison between the relative volumes of the transmit and receive signal levels. Furthermore, it is not clear that such "see-saw" action provides benefits commensurate with the cost of providing them.

It is therefore an object of the present invention to provide voice-switched operation in a loudspeaking telephone that minimizes speech clipping in a cost effective manner.

It is another object of the present invention to eliminate the direct comparison of transmit and receive signals in determining transmit channel and receive channel amplification.

SUMMARY OF THE INVENTION

The present invention of a voice-switched telephone circuit with a center idle state is characterized by a transmit channel having a microphone, an attenuator, and an amplifier in series; a receive channel having an attenuator, an amplifier, and a loudspeaker in series; a hybrid circuit interconnecting the transmit and receive channels to a two wire telephone line; a control circuit, responsive to signal energy in the transmit channel exceeding a predetermined threshold, for simultaneously increasing the amplification of the transmit channel and increasing the loss of the receive channel; and a second control circuit, responsive to signal energy in the receive channel exceeding a predetermined threshold, for simultaneously increasing the amplification of the receive channel and increasing the loss of the transmit channel.

In a preferred embodiment of the invention the transmit and receive channel amplifiers each have two gain states (0 dB/+20 dB), and the transmit and receive channel attenuators have two loss states (0 dB/−20 dB). In the preferred embodiment, switching loop hysteresis provides improved margin against oscillation such that if the switching gain was insufficient to cause oscillation in the absence of signal energy, it is even less able to oscillate in the presence of signal energy.

It is a feature of the present invention that when only a minimum amount of signal energy is present in either channel, transmission is possible in both directions simultaneously, albeit at reduced levels.

It is another feature of the invention that independent control circuits for both transmit and receive channels provide a design that is both simple and cost effective.

DETAILED DESCRIPTION

Figure 1:
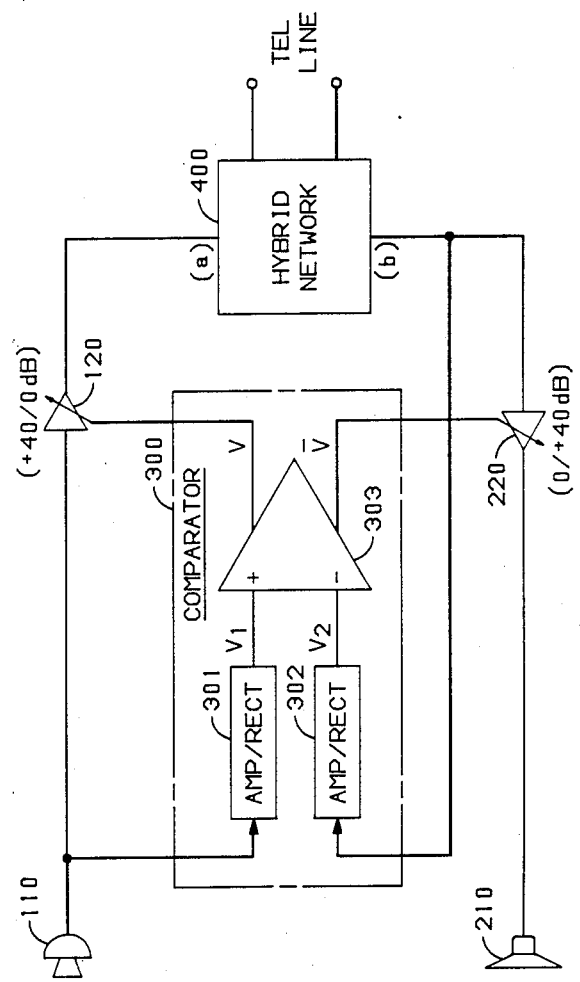
FIG. 1 is a prior art voice-switched telephone circuit, in block diagram form, using direct comparison of transmit and receive signal levels.

FIG. 1 discloses a prior art loudspeaking telephone set in which transmission priority is given to the loudest talker. Microphone 110 is a transducer that is responsive to audible sounds at its input for converting same into electrical signals at its output. Amplifier 120 provides either 40 dB of gain or 0 dB of gain under the control of comparator 300. The output signal from amplifier 120 is delivered to hybrid network 400 which interconnects a 4-wire circuit to a 2-wire circuit (telephone line). In a similar manner amplifier 220, under the control of comparator 300, provides either 0 dB of gain or 40 dB of gain to signals received from hyrid network 400. Note that when amplifier 120 is providing 40 dB of gain, amplifier 220 is providing 0 dB of gain and vice versa; thus, the net amplification around the loop remains constant. To avoid oscillation however, the net loss around the loop must exceed the amplification (40 dB in this example).

One source of loss is introduced by the attenuation between port (a) and port (b) of hybrid network 400. This loss is designated "trans-hybrid" loss for which a typical value is 15 dB. Another source of loss is introduced by inefficient acoustic coupling between loudspeaker 210 and microphone 110. This loss is designated "electro-acoustic" loss (EAL) and a representative value of 30 dB is typical when the loudspeaker-microphone separation is in the order of 18 inches; naturally, a greater separation increases the loss.

Comparator 300 compares the signal energy in the transmit channel to the signal energy in the receive channel. The measure of energy in a signal is generally approximated by a DC voltage acquired through amplification and rectification of the signal itself. This is performed by functional blocks 301 and 302. The outputs of the amplifier/rectifier circuits are DC voltages V1, V2 which are processed by differential amplifier 303. When V1>V2, output voltage V is in the logical "1" state and turns on amplifier 120. This condition results when the local user of the FIG. 1 circuit generates more signal energy than the distant user. When neither user is speaking, however, a problem exists whereby varying levels of background noise cause comparator 300 to alternate between two capture states. To reduce the problem of capturing against noisy background signals, noise guard circuits are often added—a noise guard circuit being nothing more than a rectifier circuit with a very long time constant. A continuous or steady signal results in a significant DC voltage change out of the noise guard circuit. This DC output is used to bias the comparator in favor of the opposite signal path from which the noise originates.

Switching loop oscillation, or chatter, is a condition whereby positive feedback causes the enabled direction of transmission to switch back and forth between states. It is a problem for many voice-switched networks using a comparator without compensation, and is readily illustrated using the simplified circuit of FIG. 1. For example, noise at the input to microphone 110 is amplified and rectified in block 301 to form voltage V1 at its output. At this point V1 is greater than V2 and differential amplifier 303 is arranged to turn on amplifier 120 and turn off amplifier 220. Amplifier 120 amplifies the noise out of microphone 110 and delivers it to port (a) of hybrid network 400. A small portion of the signal entering port (a) emanates from port (b) of hybrid network 400 and is delivered to amplifier/rectifier 302 which produces voltage V2 a short time later. In many cases the overall amplification provided by amplifier 120 and amplifier/rectifier 302 is sufficient to cause voltage V2 to be greater than voltage V1. When this is the case differential amplifier 303 turns off amplifier 120 and turns on amplifier 220. According to the time constants of the circuit, V2 will become less than V1 since amplifier 120 has turned off and the process will be repeated.

Figure 2:
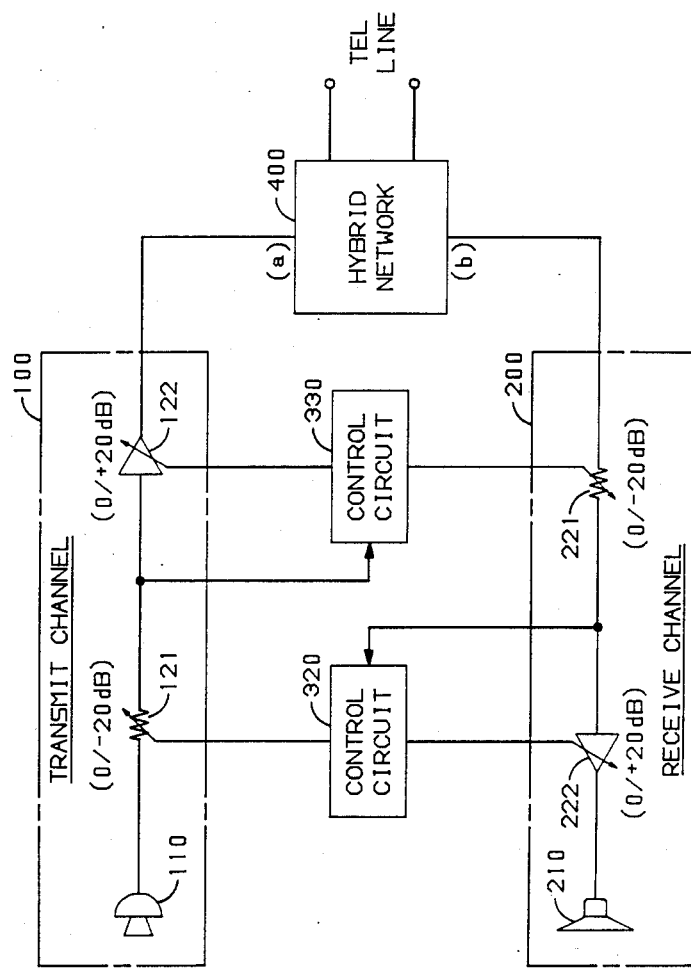
FIG. 2 is a block diagram of a voice-switched telephone network in accordance with the invention.

FIG. 2 discloses a loudspeaking telephone set in accordance with the principles of the invention in which the telephone set resides neither in the transmit nor receive mode in its quiescent state. The presence of sufficient transmit signal energy causes the transmit channel gain to increase and the receive channel gain to decrease. The presence of sufficient receive signal energy causes the reverse action. Just as in the prior art circuit of FIG. 1, the overall loop gain of the transmit and receive channels is maintained constant. Transmit channel 100 includes microphone 110, attenuator 121 and amplifier 122. Receive channel 200 includes attenuator 221, amplifier 222 and loudspeaker 210. Also similar to the prior art circuit of FIG. 1, transmit channel 100 and receive channel 200 each have a control range of 40 dB; however, gain switching in any channel is distributed in such a manner that minimum switching noise is created while maximum speed is achieved. An example is presented to demonstrate the normal operation of the invention.

When neither the local user nor the distant user is speaking, the circuit of FIG. 2 is in its idle state; that is to say, the amplifiers and the attenuators are in their unity gain (0 dB) state. Audible sounds from the local user are presented to microphone 110 which converts these sounds into an electric signal. This signal passes through attenuator 121 into amplifier 122 and also into control circuit 330. Once the control circuit 330 senses sufficient signal energy, it increases the amplification of amplifier 122 in the transmit channel by 20 dB and increase the loss of attenuator 221 in the receive channel by 20 dB. The output signal from transmit channel 100 then passes into port (a) of hybrid 400 which directs most of the energy onto the telephone line; however, a small amount finds its way back into the receive channel through port (b) of the hybrid network. When the local user is finished speaking, control circuit 330 detects the decrease in signal energy falling below a predetermined threshold and returns amplifier 122 and attenuator 221 back to their unity gain states. The circuit is now in the quiescent (center idle) state. Signal energy from a distant user enters the circuit of FIG. 2 from the telephone line via hybrid netword 400 which directs the signal through port (b) into receive channel 200. This signal passes through attenuator 221 amplifier 222 and control circuit 320 which is responsive to the signal energy exceeding a predetermined threshold for simultaneously increasing the gain of the receive channel by 20 dB and increasing the loss of the transmit channel by 20 dB. After amplification the receive signal is converted into an audible sound by loudspeaker 210. Once the distant user stops talking, control circuit 320 detects the decrease in signal energy falling below a predetermined threshold and returns amplifier 222 and attenuator 121 back to their unity gain (0 dB) center idle state.

Figure 3:
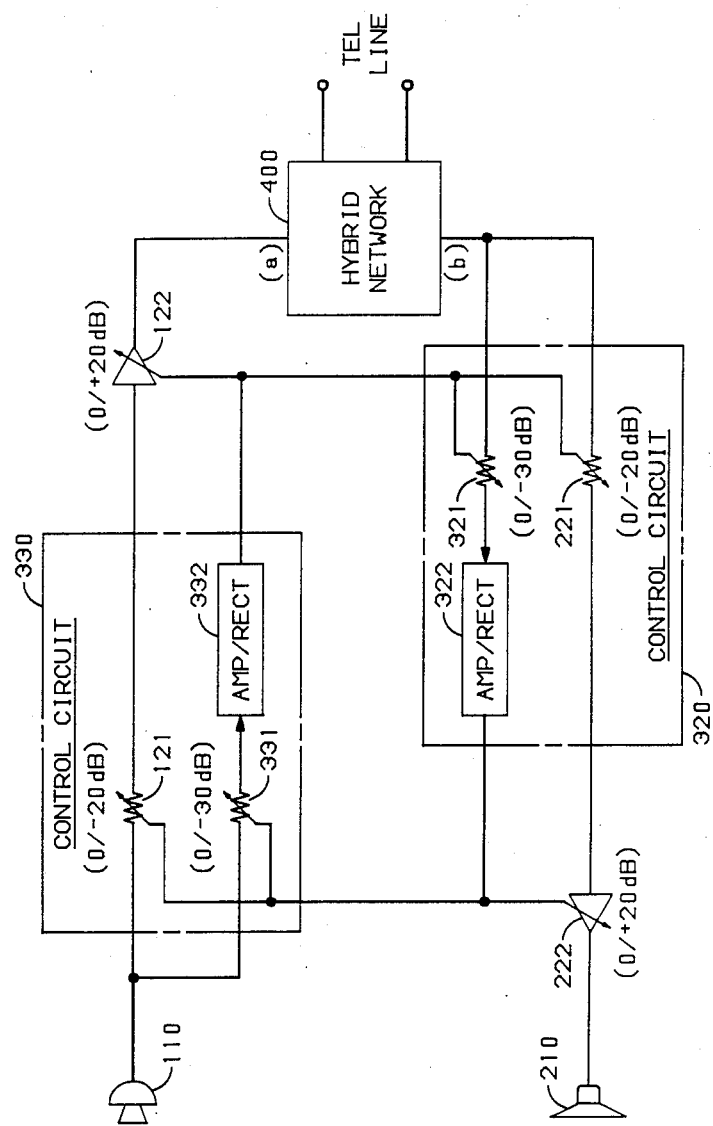
FIG. 3 is a more detailed version of FIG. 2 illustrating the switching loop.

Referring now to the diagram of FIG. 3 control circuit 330 generally includes variable attenuator 331 and amplifier/rectifier 332. Note that although the input signal to control circuit 330 was provided by the output of attenuator 121 in FIG. 2, it comes directly from microphone 110 in FIG. 3. This particular layout is one of convenience and serves to highlight the additional protection against switching loop oscillation that is provided. In the situation whereby background noise, detected by microphone 110, is sufficient to exceed the threshold within control circuit 330 and increase the gain of amplifier 122 by 20 dB, there is a corresponding increase in the attenuation within control circuit 320. The net affect is that an additional 10 dB of margin is provided against switching loop oscillation. While the actual numbers mentioned are only illustrative they are made possible by the overall architecture of the invention.

Figure 4:
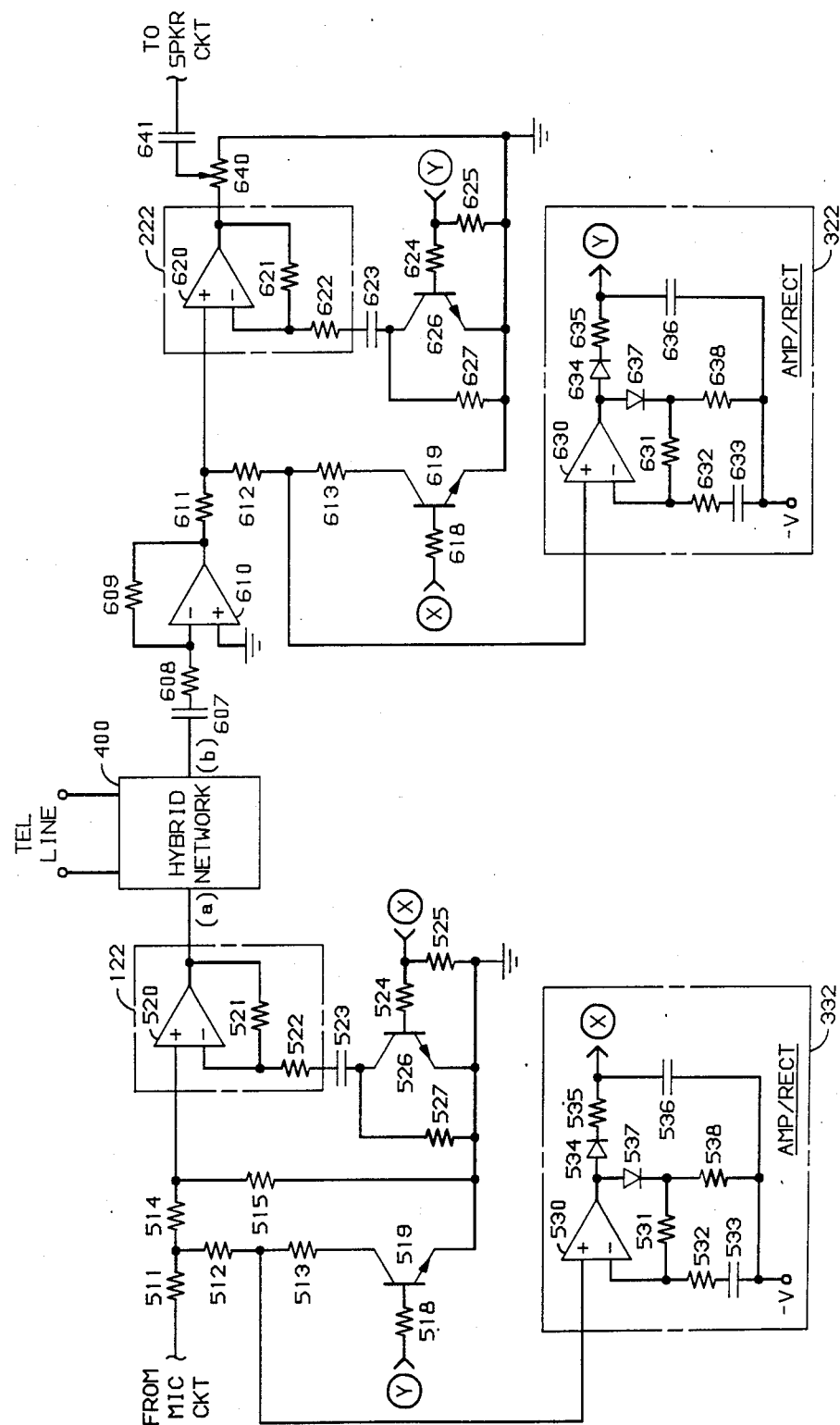
FIG. 4 is a detailed schematic drawing of a preferred embodiment of the invention.

FIG. 4 discloses a detailed schematic of the present invention using positive and negative voltage sources as well as a ground connection. Although not shown, positive voltage sources are used in powering each of the amplifiers 520, 530, 610, 620 and 630. It is readily possible to avoid the use of a negative voltage supply by deriving a new voltage level between the positive voltage source and ground. This new voltage would replace all the ground connections in FIG. 4, and ground would replace all the $-V$ connections in FIG. 4.

Referring to the FIG. 4 schematic, microphone circuits, which are well known in the art, comprise a microphone transducer and perhaps a preamplifier. Resistors 511-515 form a network whose attenuation is controlled by switch components 518-519. This switch is activated by a positive voltage at input Y that saturates transistor 519 and thereby shorts resistor 513 to ground. Activation of the switch attenuates signals passing from the microphone circuit into amplifier 122 by approximately 20 dB. It also attenuates signals passing from the microphone circuit into amplifier/rectifier 332 by 30 dB as discussed in connection with FIG. 3. At this point it is noted that the efficient placement of switch components 518-519 in FIG. 4 combines into a single attenuator the functions of attenuators 121 and 331 shown in FIG. 3.

Following the progress of the signal in the transmit channel toward hybrid network 400, resistor 515 forms a part of an attenuator network, and provides a source of DC bias for amplifier 520 to keep its input average voltage in the midrange area (0 volts). Amplifier network 122 provides either 0 dB or 20 dB of gain under control of components 523-527. Naturally, the 20 dB gain state would be invoked when signal energy from the microphone circuit, after amplification and rectification in network 332, creates a positive DC voltage at the terminal designated X. This positive DC voltage is delivered to switch components 523-526 and causes transistors 526 and 619 to saturate, thereby placing an AC short circuit from resistors 522 and 613, respectively, to ground. When resistor 522 is AC grounded, the negative feedback in amplifier 122 is reduced and its gain is thereby increased. The overall gain of amplifier 122 is related to the ratio of feedback resistor 521 and the impedance presented by resistors 522 and 527. When, for example, transistor 526 is "off", the overall series impedance is $R_{off}=R(522)+R(527)$ and the gain of amplifier 122 is approximately $R(521)/R_{off}$. When transistor 526 is "on", the overall series impedance is $R_{on}=R(522)$ and the gain of amplifier 122 is approximately $R(521)/R_{on}$. After amplification, the transmit channel signal is interconnected to port (a) of hybrid network 400 and thus to the telephone line. Impedance matching is important because it assures that most of the transmit channel signal energy is transferred to the telephone line and only a minimal amount "leaks" into the receive channel.

Amplifier/rectifier 332 is responsive to energy int he transmit channel for generating a DC voltage corresponding to the magnitude of the signal energy. Differential amplifier 530 and associated components 531-533 provide amplification for the transmit signal. Diode 534 and resistor 538 cooperate in setting a threshold voltage for differential amplifier 530. Diode 534 rectifies the amplified signal and capacitor 536 stores the resulting DC voltage. The speed with which capacitor 536 is allowed to charge is controlled by a so-called "attack" or "capture" time constant equal to the product of the magnitudes of capacitor 536 and resistor 535. Although a rapid attack time is desirable, switching noise transients limit the speed. The present invention advantageously distributes the switched gain (loss) between transmit and receive channels, and with the same noise increases the switching speed by an order of magnitude.

In the receive circuit of FIG. 4, an impedance matching amplifier circuit is formed from components 607-610 which is responsive to signals received from the telephone line via port (b) of hybrid network 400. Similar to resistors 511-513 in the transmit channel, resistors 611-613 in the receive channel form a network whose attenuation is controlled by resistor 618 and transistor 619. A positive voltage at input X saturates transistor 619 and places a short circuit from resistor 613 to ground. Activation of this transistor 619 attenuates receive signals passing to ampifier 222 by approximately 20 dB; it also attenuates signals passing to amplifier/rectifier 322 by 30 dB, whose operation is identical to that of amplifier/rectifier 332 described in connection with the transmit channel circuits. Potentiometer 640 is used to select the output level of a loudspeaker connected via capacitor 641. The terminals designated "X" and "Y" are not shown connected for schematic diagram clarity. In actual operation those terminals designated "X" are connected together, and those terminals designated "Y" are connected together.

Although a specific embodiment is disclosed to illustrate the operation of the invention, it is understood that various modifications are possible within the scope of the invention and the disclosed embodiment is intended for illustration rather than limitation.

What is claimed is:
1. In combination,
a transmit channel comprising the series connection of a microphone, an attenuator, and an amplifier;
a receive channel comprising the series connection of an attenuator, an amplifier, and a loudspeaker;
hybrid interconnection means, interconnecting said transmit channel and said receive channel to a two-wire circuit;
means for deriving a firt unidirectional voltage whose magnitude is proportional to signal energy in the transmit channel;

means responsive to the first unidirectional voltage exceeding a first predetermined threshold for simultaneously increasing the gain of the transmit channel amplifier and the loss of the receive channel attenuator by substantially equal amounts;

means for deriving a second unidirectional voltage whose magnitude is proportional to signal energy in the receive channel; and means responsive to the second unidirectional voltage exceeding a second predetermined threshold for simultaneously increasing the gain of the receive channel amplifier and the loss of the transmit channel attenuator by substantially equal amounts.

2. The combination of claim 1 wherein said transmit channel amplifier and attenuator and said receive channel amplifier and attenuator each provide two discrete gain levels; whereby binary decisions regarding signal magnitude in the transmit and receive channels are conveniently used for control.

3. The combination of claim 2 wherein the transmit channel and the receive channel each provide a total of three discrete transmission levels; whereby a transmit mode, a quiescent mode, and a receive mode are defined.

4. The combination of claim 1 further including:

means responsive to the first unidirectional voltage exceeding the first predetermined threshold for increasing the loss of an attenuator in series with the second unidirectional voltage deriving means by an amount greater than said equal amount; and means responsive to the second unidirectional voltage exceeding the second predetermined threshold for increasing the loss of an attenuator in series with the first unidirectional voltage deriving means by an amount greater than said equal amount.

5. A loudspeaking telephone set for connection to a two-wire telephone line including:

a microphone, responsive to audible sounds, for converting same into electrical signals;

transmitting level detecting means, responsive to the electrical signals from the microphone for providing a first binary signal having one level when the magnitude of said electrical signals from the microphone exceeds a first threshold voltage, and having another level when the magnitude of said electrical signals from the microphone is less than the first threshold voltage;

receiving level detecting means, responsive to electrical signals received from the two-wire telephone line, for providing a second binary signal having one level when the magnitude of said electrical signals from the telephone line exceeds a second threshold voltage, and having another level when the magnitude of said electrical signals from the telephone line is less than the second threshold voltage;

transmitting level control means, jointly responsive to the first and second binary signals for amplifying the electrical signals from the microphone by one of three discrete amounts;

hybrid circuit means, interconnecting the telephone set with the two-wire telephone line;

receiving level control means, jointly responsive to the first and second binary signals for amplifying the electrical signals received from the two-wire telephone line by one of three discrete amounts; and a loudspeaker for converting the amplified electrical signals from the two-wire telephone line into audible sounds.

6. A voice-switched telephone circuit including: a transmit channel having a microphone and a first variable gain amplifier with three discrete gain levels; a receive channel having a loudspeaker responsive to a second variable gain amplifier with three discrete gain levels; and a hybrid circuit interconnecting the transmit and receive channels to a two-wire telephone line, characterized by:

first control means, responsive to the magnitude of signal energy emanating from the microphone exceeding a predetermined transmit threshold, for simultaneously increasing the gain of the first variable gain amplifier and decreasing the gain of the second variable gain amplifier by substantially equal discrete amounts; and second control means, responsive to the magnitude of signal energy received from the two-wire telephone line exceeding a predetermined receive threshold, for simultaneously increasing the gain of the second variable gain amplifier and decreasing the gain of the first variable gain amplifier by substantially equal discrete amounts.

7. The voice-switched telephone circuit of claim 6 wherein the first variable gain amplifier comprises the series electrical connection of a first attenuator and a first amplifier, each having two discrete gain levels; and wherein the second variable gain amplifier comprises the series electrical connection of a second attenuator and a second amplifier, each having two discrete gain levels.

8. The voice-switched telephone circuit of claim 6 further characterized by:

a third attenuator, in series with the first control means, responsive to the second control means for increasing its attenuation by a fixed amount when the magnitude of the signal energy received from the two-wire telephone line exceeds the predetermined receive threshold; and a fourth attenuator, in series with the second control means, responsive to the first control means for increasing its attenuation by said fixed amount when the magnitude of the signal energy emanating from the microphone exceeds the predetermined transmit threshold.

9. The voice-switched telephone circuit of claim 7 wherein said first attenuator receives its input from the microphone and includes a pair of output ports, one output port being electrically connected to the first amplifier and the other output port being electrically connected to the first control means; and wherein the second attenuator receives its input from the hybrid circuit and includes a pair of output ports, one output port being electrically connected to the second amplifier and the other output port being electrically connected to the second control means.

10. The voice-switched telephone circuit of claim 9 wherein electrical signals emanating from said one output port of the first and second attenuators are attenuated by a lesser amount than the electrical signals emanating from said other output port of the first and second attenuators.

11. Signal processing apparatus including a transmit channel having a first variable gain amplifier, a receive channel having a second variable gain amplifier, and means interconnecting the transmit and receive channels to a two wire circuit.

first control means responsive to signal energy in the transmit channel exceeding a transmitting level threshold for simultaneously increasing the gain of the first variable gain amplifier and decreasing the gain of the second variable gain amplifier by substantially equal amounts;

second control means responsive to signal energy in the receive channel exceeding a receiving level threshold for simultaneously increasing the gain of the second variable gain amplifier and decreasing the gain of the first variable gain amplifier by substantially equal amounts;

said first control means including a first attenuator, responsive to signal energy in the receive channel exceeding the receiving level threshold, for increasing the transmitting level threshold; and and second control means including a second attenuator, responsive to signal energy in the transmit channel exceeding the transmitting level threshold, for increasing the receiving level threshold.

* * * * *